United States Patent [19]

Mery et al.

[11] Patent Number: 4,936,422
[45] Date of Patent: Jun. 26, 1990

[54] SPRING FOR A DISC-BRAKE

[75] Inventors: Jean-Claude Mery, Pavillons Sous Bois; Michel Pindat, Pantin, both of France

[73] Assignee: Bendix France, Drancy, France

[21] Appl. No.: 380,917

[22] Filed: Jul. 17, 1989

[30] Foreign Application Priority Data

Mar. 29, 1988 [FR] France ............................ 88 11321

[51] Int. Cl.⁵ .............................................. F16D 65/02
[52] U.S. Cl. .................................................. 188/73.38
[58] Field of Search .............. 188/73.31, 73.32, 73.35, 188/73.36, 73.37, 73.38, 205 A

[56] References Cited

U.S. PATENT DOCUMENTS

| 4,422,534 | 12/1983 | Oshima | 188/73.38 |
| 4,498,564 | 2/1985 | Tamura | 188/73.32 |
| 4,673,065 | 6/1987 | Gerard et al. | 188/73.38 |
| 4,699,254 | 10/1987 | Mery | 188/73.36 |

FOREIGN PATENT DOCUMENTS 2132292 7/1984 United Kingdom .

Primary Examiner—Duane A. Reger
Attorney, Agent, or Firm—Larry J. Palguta; Ken C. Decker

[57] ABSTRACT

A disc brake comprises a caliper mounted slideably relative to the axis of the rotating disc, on a fixed support by way of an axial column, two friction members mounted on carrier plates anchored and axially slideable inside an opening in the fixed support so as to come into frictional engagement with the opposing sides of the disc when a brake motor is operated, and a locking element extending axially between at least one opening formed in the caliper and at least one opening formed in the fixed support so as to help guide the caliper on the fixed support and prevent it pivoting about the column when it assumes its normal operating position. A spring is mounted on the caliper on the side located circumferentially at a distance from the axial column, the mounting portion being elastically mounted inside at least one opening provided in the caliper for the locking element to pass through, the mounting portion surrounding substantially the part of the locking element passing through said opening, the rigid working portion being capable of biasing elastically the friction-member carrier plates substantially radially towards the axis of the disc.

7 Claims, 2 Drawing Sheets

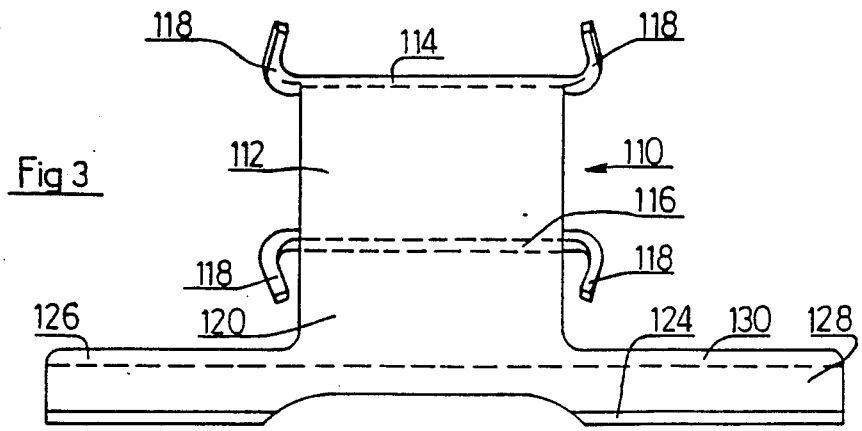
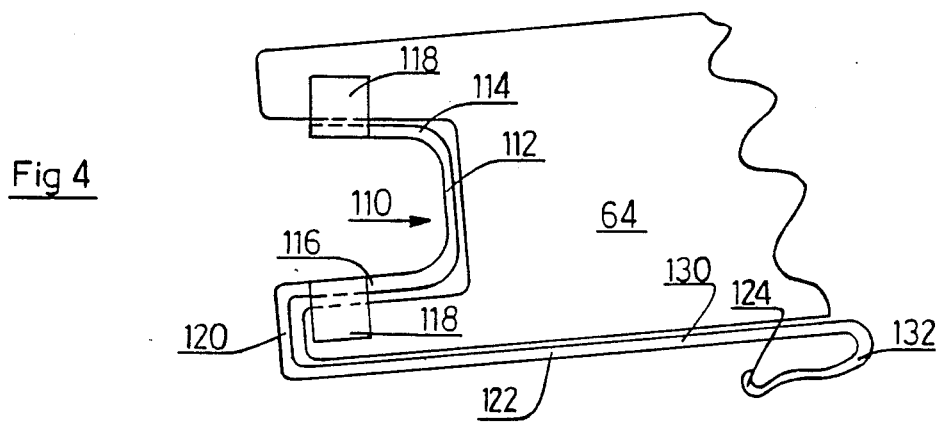
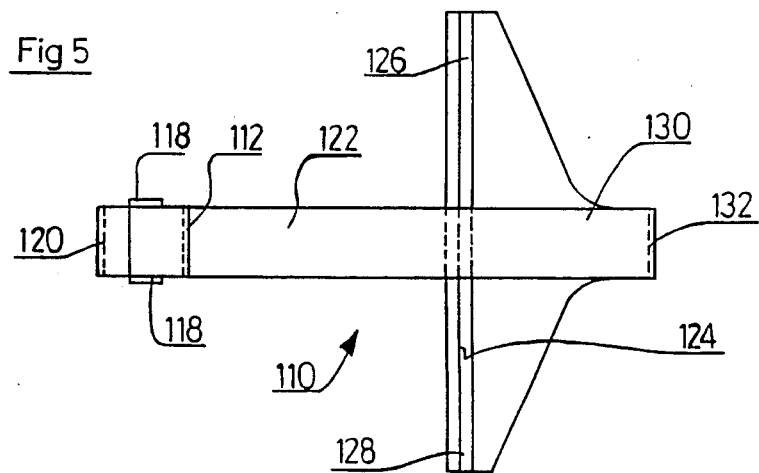

SPRING FOR A DISC-BRAKE

BACKGROUND OF THE INVENTION

The present invention relates to a spring for a disc-brake with a sliding caliper, as well as a disc brake equipped with such a spring.

The invention concerns more particularly a multipurpose spring intended to equip a disc brake, the caliper of which slides relative to a fixed support by means of an axial column.

The U.S. Pat. No. 4,673,065 assigned to the present Assignee discloses a spring for a disc brake of the type comprising a caliper mounted slideably parallel to the axis of a disc rotating on a fixed support by means of at least two axially sliding surfaces formed on the caliper and on the fixed support and held elastically in contact, and two friction members anchored and axially slideable inside an opening of said fixed support, so as to come into frictional contact with the opposing sides of said disc when a brake motor is operated, said spring being mounted elastically inside an opening formed in the arch of the caliper and exerting on the plates carrying said friction members a radial force directed substantially along a radius of the disc and in the direction of the axis of the latter and a tangential force perpendicular to said radial force so as to bias each of the friction members tangentially relative to the circumference of said disc so as to ensure that said members are held in a preferred lateral position.

This known spring is characterized in that it consists of a folded metal blade comprising a mounting portion joined elastically, via its sides located circumferentially at a distance from each other, to two rigid working portions, a first rigid portion extending parallel to the axis of the disc and being capable of elastically biasing, with its two free ends, said carrier plates in a substantially circumferential direction, a second of the rigid portions extending also parallel to the axis of the disc and being capable of elastically biasing, with its two free ends, the carrier plates substantially radially towards the axis of the disc.

With such an arrangement, the spring is held by its mounting portion in the opening formed in the arch of the caliper, its working portions being located in recesses cut in the arch and adjacent to the opening.

The recesses cut in the arch have the effect of reducing the thickness of the latter and hence its strength. The co-pending U.S. patent application Ser. No. 200,756 filed May 31, 88 and assigned to the present Assignee, therefore proposed a spring which was simplified by eliminating the elastic portion and the rigid portion which applies substantially radial forces to the carrier plates. The elimination of these forces could in fact be regarded as acceptable with a certain orientation of the force applied by the other rigid portion of the spring on the bearing surface formed on the side of a projection formed on the peripheral edge of each of the carrier plates, thus modified. The elimination of this part of the spring would enable the recess cut in the arch of the caliper to be reduced so as to give this part adequate clearance, thereby improving the robustness of the brake equipped with such a simplified spring.

However, the elimination of the substantially radial forces on the carrier plates results in the carrier plates having greater freedom of movement, leading, in certain applications, to vibration of the carrier plates, which is transmitted to the caliper, and thus causing considerable noise and premature wear of the friction members and the brake. It has also been noticed that, when the caliper vibrates in this manner relative to the fixed support, the parts of the caliper which come into contact with the fixed support or the locking pin are subject to a certain degree of burring.

SUMMARY OF THE INVENTION

The present invention therefore relates to a disc brake spring applying substantially radial forces to the friction-element carrier plates, without the thickness of the caliper arch being reduced. In addition, an object of the invention is to prevent burring of the parts of the caliper which are brought into contact with the parts of the fixed support or the locking pin.

This object of the invention is achieved with a spring for a disc brake of the type comprising a caliper mounted slideably relative to the axis of the rotating disc, on a fixed support by means of an axial column integral with the caliper or the fixed support and cooperating with a corresponding bore in the fixed support or the caliper, two friction members mounted on carrier plates anchored and axially slideable inside an opening in the fixed support so as to come into frictional engagement with the opposing sides of the disc when a brake motor is operated, and a locking element extending axially between at least one opening formed in the caliper and at least one opening formed in the fixed support so as to help guide the caliper on the fixed support and prevent it pivoting about the column when it assumes its normal operating position, this spring consisting of a folded metal blade comprising a mounting portion elastically joined to a rigid working portion, characterized in that it is mounted on the caliper on the side located circumferentially at a distance from the axial column, the mounting portion being elastically mounted inside at least one opening provided in the caliper for the locking element to pass through, the mounting portion surrounding substantially the part of the locking element passing through said opening, the rigid working portion being capable of biasing elastically the friction-member carrier plates substantially radially towards the axis of the disc.

BRIEF DESCRIPTION OF THE DRAWINGS

FIG. 3 is a front view of the spring according to the invention;

FIG. 4 is a side view of the spring according to the invention; and

FIG. 5 is a plan view of the spring according to the invention.

DETAILED DESCRIPTION OF THE INVENTION

An embodiment of a spring according to the present invention will now be described by way of example with reference to the accompanying drawings.

Figure 1:
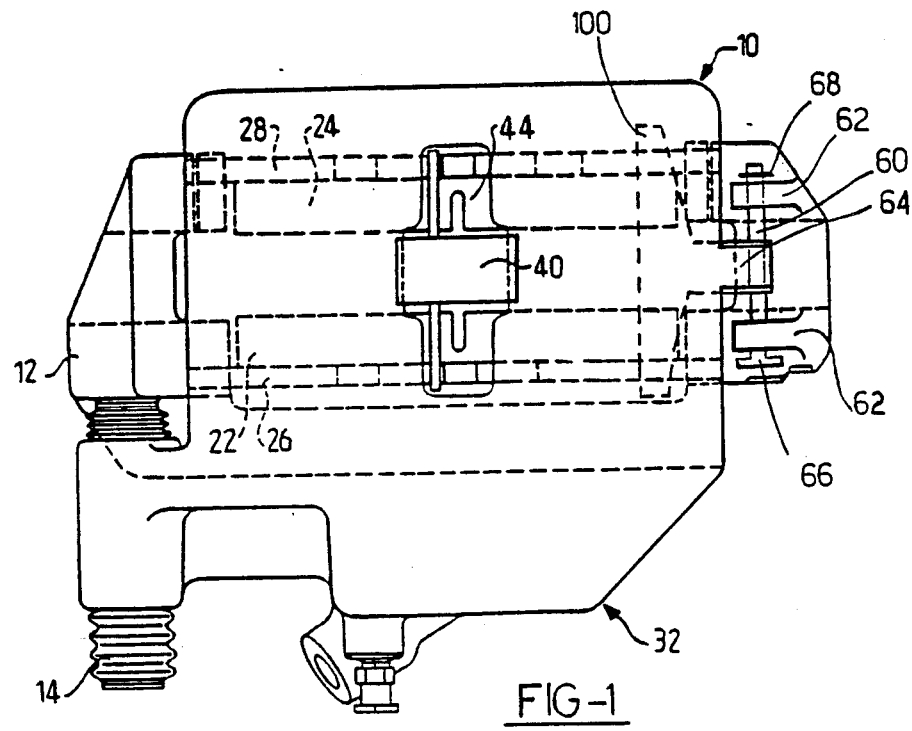
FIG. 1 is a plan view of a disc brake provided with a spring constructed according to the present invention.
Figure 2:
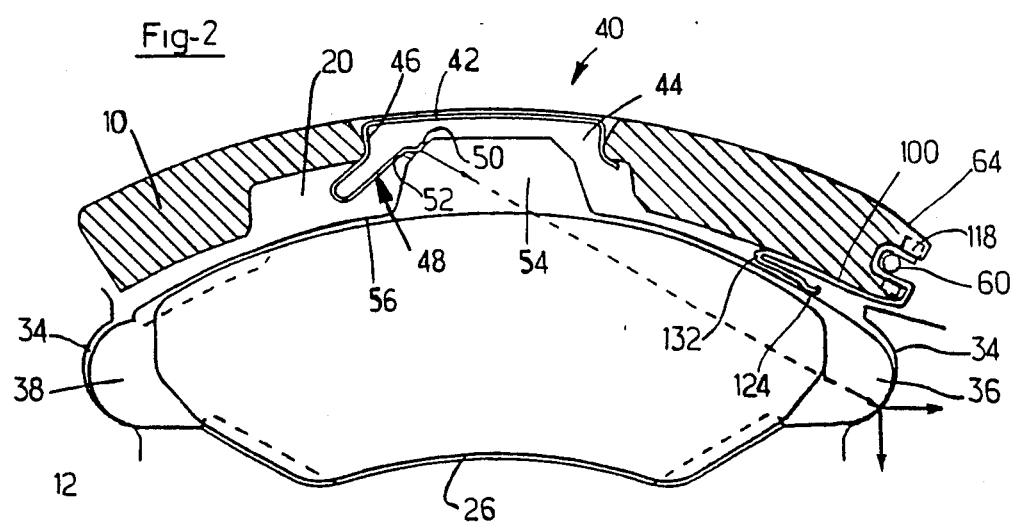
FIG. 2 is a cross-sectional view of the disc-brake of FIG. 1.

The disc brake shown in FIGS. 1 and 2 is of the type comprising a caliper 10 slideably mounted on a fixed support 12 by means of an axial column 14. The disc-brake comprises, in addition, two friction members 22 and 24 provided with carrier plates 26 and 28, respectively, and capable of coming into frictional engagement with a rotating disc when a hydraulic brake motor 32 is operated. The friction members 22 and 24 are anchored and able to slide inside an opening 34 formed in the fixed support 12. In the example shown, the two friction members 22 and 24 have ends 36 and 38 with a circular profile cooperating with the complementary circular profiles of the opening 34. This type of brake is described and shown in greater detail in European Patent EP-A-0,002,399. For this type of friction member, it is desirable to exert on the carrier plate a tangential force which keeps the latter in a preferred lateral position, bearing against the opening provided in the fixed support 12.

The disc brake shown in FIGS. 1 and 2 is provided with a spring 40 consisting of a folded metal blade which comprises a mounting portion 42, having the general shape of the upper-case Greek letter omega, mounted elastically inside an opening 44 formed in the arch of the caliper 10.

The side 46 of the spring 40 is extended, into a recess 20 cut in the arch of the caliper 10, by an elastic portion 48 ending in a rigid portion 50 which extends axially on either side of the elastic portion 48. The rigid portion has two free ends which bias each of the carrier plates 26, 28 substantially circumferentially by cooperating with bearing surfaces 52 formed on the side of a projection 54 formed on the peripheral edge 56 of each of the carrier plates 26 and 28. This rigid portion 50 exerts a substantially tangential force on the projection 54.

In order for the caliper 10 to be sufficiently strong, it is not possible to cut inside it a second recess so that the other side of the spring 40 is configured so as to exert a substantially radial force on the carrier plates, as indicated in the abovementioned co-pending U.S. patent application Ser. No. 200,756.

In a known manner, the caliper 10 is held in position by a pin 60 passing into bores provided in lugs 62 integral with the fixed support, and into an opening provided in an extension 64 of the caliper. The pin, which is held in position by its enlarged head 66 and by a clip 68, prevents pivoting of the caliper about the axis of the column 14 and helps guide the caliper on the fixed support. It may be easily removed when it is required to pivot the caliper about the axis of the column so as to gain access to the friction members in order to replace them, where required.

The disc brake shown in FIG. 1 is provided with a spring 100 constructed in accordance with the present invention and shown more particularly in FIGS. 3 to 5. The spring 100 consists of a folded metal blade which comprises a mounting portion 110, having the general shape of a "U" in cross-section, mounted elastically in the opening provided in the extension 64 of the caliper and having a complementary shape. This mounting portion 110 has a base 112 joining two lateral parts 114 and 116. Each lateral part has, formed on it, two externally oriented lugs 118 which hold the spring laterally inside the opening and help engage it elastically inside this opening in the extension 64.

One of the lateral parts 116 is extended, approximately at right angles, by a rigid portion 120, itself extended approximately at right angles by another rigid portion 122 so as to surround the edge of the opening inside the extension 64 and support the working portion of the spring on the caliper side adjacent to the friction-member carrier plates. The three rigid portions 116, 120 and 122 are also configured so as to have a shape matching the edge of the opening in the extension 64 and help hold the spring elastically on this edge.

The rigid portion 122 is extended by an elastic portion 130 which forms a pronounced bend 132 and ends in a rigid working portion 124 which is in the form of a trough and extends axially on either side of the elastic portion 130. This rigid portion 124 has two free ends 126 and 128 which bias each of the carrier plates 26 and 28, respectively, in a substantially radial direction.

Through reaction to the force applied to the carrier plates 26 and 28 and by means of the bend 132 formed in the elastic portion 130, the rigid portion 122 exerts on the edge of the extension 64 of the caliper 10 an upward force with reference to FIG. 2, this reactive force keeping the mounting portion 110 of the spring 100 and the locking pin 60 in contact.

It will be understood that, as a result of the invention, the spring 100 is held in place in the extension 64 of the caliper 10 by the elasticity of its U-shaped mounting portion 110, by the lugs 118 and by the rigid portion 122 and does not risk getting lost or damaged during removal or reassembly of the friction elements. Moreover, when the caliper 10 is locked on the fixed support 12 by the pin 60, the spring 110 is itself locked on the caliper 10 and is unable to escape. During normal operation of the disc-brake, the spring 100 biases the caliper 10 radially outwards, keeping the pin 60 in contact with the edge of the opening formed in the extension 64 of the caliper 10, the arm 116 of the mounting portion being interposed between them. In the case of heavy use, i.e. where high stresses occur and where the assembly is likely to start vibrating, the interposition of this arm 116 between the pin 60, which is generally made of steel, and the part of the caliper surrounding it, which is generally made of cast iron, prevents the latter part being burred by the pin 60. Finally, the spring 100 cooperates with the spring 40, the former biasing the carrier plates substantially radially towards the axis of the disc, the latter biasing them substantially circumferentially, according to the teaching of the three aforementioned documents, with the additional advantage of being able to use a strengthened caliper arch and unmodified carrier plates.

It is quite obvious that the invention is not limited to the embodiment described. For example, the mounting portion can be adapted to the shape of the extension(s) formed in the caliper and intended to lock it on the fixed part. Similarly, a transverse opening may be provided in the elastic portion adjacent to the rigid portion so as to reduce the load applied by the spring to the friction members when the latter move towards the center plane as a result of wear of these friction members. Similarly, it is possible to provide a cut-away part in the working portion of the spring, as shown in dotted lines in FIG. 5, so as to separate the ends of the rigid portion which bias the carrier plates.

We claim:

1. A spring for a disc brake of the type comprising a caliper mounted slidably, relative to an axis of a rotating disc, on a fixed support by means of an axial column integral with one of the caliper and the fixed support and cooperating with a corresponding bore in one of the fixed support and the caliper, two friction members mounted on carrier plates anchored and axially slidable inside an opening in the fixed support so as to come into frictional engagement with opposing sides of the disc when a brake motor is operated, and a locking element extending axially between at least one opening formed in the caliper and at least one opening formed in the fixed support so as to help guide the caliper on the fixed support and prevent the caliper from pivoting about the column when the caliper assumes a normal operating position, said spring consisting of a folded metal blade comprising a mounting portion elastically joined to a rigid working portion and being mounted on the caliper on a side located circumferentially at a distance from the axial column, the mounting portion being elastically mounted inside at least one opening provided in the caliper for the locking element to pass through, the mounting portion surrounding substantially a part of the locking element passing through said opening, the rigid working portion being capable of biasing elastically the friction-member carrier plates substantially radially toward the axis of the disc.

2. The spring according to claim 1, wherein the mounting portion has a general shape of a "U" in cross-section.

3. The spring according to claim 2, wherein lateral parts of the mounting portion each have two lugs extending outside said mounting portion.

4. A disc brake of the type comprising a caliper mounted slideably relative to an axis of a rotating disc, on a fixed support by means of an axial column integral with one of the caliper and the fixed support and cooperating with a corresponding bore in one of the fixed support and the caliper, two friction members mounted on carrier plates anchored and axially slideable inside an opening in the fixed support so as to come into frictional engagement with opposing sides of the disc when a brake motor is operated, and a locking element extending axially between at least one opening formed in the caliper and at least one opening formed in the fixed support so as to help guide the caliper on the fixed support and prevent the caliper from pivoting about the column when the caliper assumes a normal operating position, a spring consisting of a folded metal blade comprising a mounting portion elastically joined to a rigid working portion and being mounted on the caliper on a side located circumferentially at a distance from the axial column, the mounting portion being elastically mounted inside at least one opening provided in the caliper for the locking element to pass through, the mounting portion surrounding substantially a part of the locking element passing through said opening, the rigid working portion being capable of biasing elastically the friction-member carrier plates substantially radially towards the axis of the disc.

5. The disc brake according to claim 4, wherein the mounting portion of said spring has a general shape of a "U" in cross-section.

6. The disc brake according to claim 5, wherein lateral parts of the mounting portion of said spring each have two lugs extending outside said mounting portion.

7. The disc brake according to claim 4, wherein the part of the locking element passing through the opening formed in the caliper is substantially surrounded by the mounting portion of the spring.

* * * * *

UNITED STATES PATENT AND TRADEMARK OFFICE
CERTIFICATE OF CORRECTION

PATENT NO. : 4,936,422
DATED : June 26, 1990
INVENTOR(S) : JEAN-CLAUDE MERY and MICHEL PINDAT It is certified that error appears in the above-identified patent and that said Letters Patent is hereby corrected as shown below:

Cover Page, item [30], delete "Mar. 29, 1988" and insert ---Aug. 29, 1988---.

Signed and Sealed this

Seventeenth Day of December, 1991

Attest:

HARRY F. MANBECK, JR.

*Attesting Officer*          *Commissioner of Patents and Trademarks*